June 26, 1923.

C. F. ANDERSON ET AL

1,459,965

WOODWORKING MACHINE

Filed Aug. 27, 1920    7 Sheets-Sheet 1

Inventors
Carl F. Anderson
Lester W. Knapp
By Brown Boettcher & Kenner
Attorneys

June 26, 1923.

C. F. ANDERSON ET AL

1,459,965

WOODWORKING MACHINE

Filed Aug. 27, 1920   7 Sheets-Sheet 6

Inventors
Carl F. Anderson
Lester W. Knapp

June 26, 1923.

C. F. ANDERSON ET AL

1,459,965

WOODWORKING MACHINE

Filed Aug. 27, 1920

Patented June 26, 1923.

1,459,965

UNITED STATES PATENT OFFICE.

CARL F. ANDERSON, OF BROOKFIELD, AND LESTER W. KNAPP, OF BERWYN, ILLINOIS, ASSIGNORS TO CONLON ELECTRIC WASHER COMPANY, OF CICERO, ILLINOIS, A CORPORATION OF NEW YORK.

WOODWORKING MACHINE.

Application filed August 27, 1920. Serial No. 406,388.

*To all whom it may concern:*

Be it known that we, CARL F. ANDERSON and LESTER W. KNAPP, citizens of the United States, residing at Brookfield, in the county of Cook and State of Illinois, and Berwyn, in the county of Cook and State of Illinois, respectively, have invented a certain new and useful Improvement in Woodworking Machines, of which the following is a full, clear, concise, and exact description, reference being had to the accompanying drawings, forming a part of this specification.

Our invention relates to wood working machines and particularly to that type of machine known as special work machine, wherein the product is that of the head members employed in the construction of rotating cylinders of washing machines.

While it is described and stated through the description that our invention is particularly adapted to produce in finished form head members for forming cylinders of washing machines, it is apparent and also understood that our invention is not necessarily limited to such use or purpose solely.

It has been the usual practice heretofore in the art to secure a blank of the desired size and perform thereon the various operations independently, which go to make up the finished head, by and on separate machines. Such a manner of procedure is obviously satisfactory so long as the product is that desired, but where production in terms of quantity is taken into account, it is apparent that this procedure meets with many objections. The greatest objection is lack of economy in the manufacture of the same, which may be considered in many ways, such as: first, the unnecessary amount of labor required, not only the attendants of the different machines, but also that required for the handling of the material from one machine to the other between operations; second, the initial cost and maintenance costs of the different machines, which is considerable in view of the work accomplished by each; third, the unusual amount of floor space required by these machines due to their bulky nature.

Our invention has for its primary aim, the overcoming of the above mentioned objections and difficulties met with in the productive manufacture of these heads, by providing a machine, which performs the various operations jointly, and which reduces to a minimum the number of attendants or operators required for performing the various woodworking operations, heretofore requiring several machines and numerous employees.

A secondary object of our invention is to provide a machine which will manufacture the cylinder heads with great rapidity, by reducing to a minimum the number of operations required per head. This is accomplished by the novel method of performing substantially in one movement of the machine, a plurality of operations upon the blank which heretofore had to be accomplished singly.

In the assembly of the washing machine cylinders, two heads are usually employed which are of such diameter that, when joined together by slat members, the cubical contents of the cylinder is sufficient to contain a suitable size washing. By our invention we provide a woodworking machine which so shapes the cylinder head that the number of slats required is reduced without materially reducing the cubical contents of the cylinder itself.

A still further object of our invention is the provision of means whereby the perimeter of the blank, when being shaped to the desired size is formed with a plurality of faces, that is, polygonal in formation. Upon each face a slat of the cylinder is secured, the slat being so spaced that, together with the perforations in the slats, a forced circulation of the washing fluid is secured. By such an arrangement we are able to eliminate an operation upon the slat in its production, as heretofore it was necessary to form one face of the slat concave, the concave face being adapted to lie flush with the circular perimeter of the head. This construction permits the number of slats employed to be reduced without sacrificing the interior dimensions of the cylinder.

In order to apprise those skilled in the art with the nature and scope of our invention, we shall now describe in detail one particular form of our invention in connection with the accompanying drawings which form part of the specification.

In the drawings

Figure 4 is a side elevational view of the machine embodying our invention showing the operator's side and control levers;

Figure 14 is a detailed view of the left head clamp member as viewed in Figure 6:

The various functions and operations of the machine will be understood with greater facility by first making a brief description of the use of the heads which constitute the product of the machine.

The present form of head is utilized in the making of clothes containers, such as are employed in rotary container types of domestic washing machines. These clothes containers are generally constructed in cylindrical form and usually consist of two substantially circular end heads which are jointed by a plurality of cross slats spaced uniformly about the circumference of the head. According to the prior practice a cylinder of average size employing circular heads requires in the neighborhood of thirty-two slats. It will hence be apparent that it is essential that the number of slats employed be reduced to a minimum in order to reduce the cost of production of the cylinder. An additional operation heretofore had to be performed upon the slats so that, when they were mounted upon the perimeter of the head, the face of the slats laid flatly to prevent splitting or warping. By forming the perimeter of the heads polygonal, that is, a face for each slat, it is found that the average size cylinder requires but thirty slats thereby eliminating two slats in the manufacture of each cylinder. Thus it is not required to perform the unnecessary operation of forming one face of the slat concave, and hence, a material reduction in the production of the slats is also attained.

In the construction of these cylinder heads heretofore, it was common practice to perform each operation separately upon the stock material or blank by separate machines, which obviously involved numerous employees and a sequence of operation requiring much handling and loss of time. The construction of the cylinder head is fully illustrated and claimed in our co-pending application, Serial No. 406,390 filed August 27, 1920.

Figure 1:
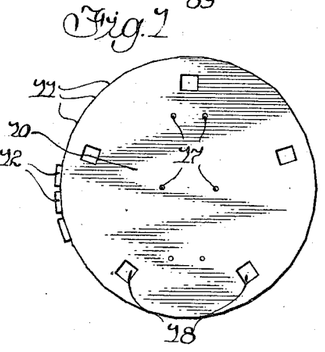
Figure 1 is a side elevational view of the finished cylinder head, the periphery of which is polygonal in formation.
Figure 2:
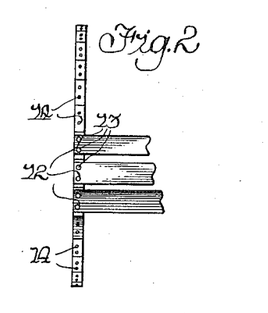
Figure 2 is an end view of the same.
Figure 3:
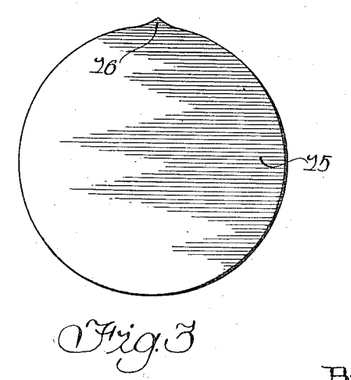
Figure 3 is a side elevational view of the blank before it is put in the machine.

Referring to Figures 1 and 2 of the accompanying drawing, it will be seen that we have shown the product of the machine, that is, the cylinder head in finished form. The head 10 is substantially annular in formation while its perimeter is composed of a plurality of faces 11. The polygonal formation of the perimeter of the head provides for an important feature in the construction of the washing machine cylinders, as will be presently described. The construction of the cylinder comprises substantially two of these heads 10 and a plurality of perforated slats 12 which span and connect the heads together. The slats 12 are secured to these heads 10 by means of small nails or screws 13, the holes 14 for which are provided in the head and slats during the manufacture of the same. The boring of these perimetrical holes comprise an operation of our machine which is considered of importance, as is permits the slat to be accurately and quickly mounted on the head 10 during assembly. The machine for producing the slat 12 in finished form from the blank as shown in Figure 2, is described and claimed in our co-pending application, Serial No. 332,953, filed Oct. 24, 1919.

The slats 12 heretofore had to be formed with one of the faces concave which was necessary in view of the fact that the perimeter of the head 10 was circular in contour. It is apparent that if such an operation were not performed upon the slats, as soon as the slats were secured to the head they would split or warp in the course of time. By providing at flat surface mounting for the slats 12, and yet maintaining a substantially circular head, it is not necessary to provide the concave face upon the slats, thereby eliminating an expensive operation in the production thereof. The blank 15, as shown in Figure 3, is comparatively larger than the finished head 10, and is provided with a small projection 16. This projection as will hereinafter be explained, is provided to permit the operator to grip the blank 15 when placing it in the head clamp of the machine.

The holes 17 are provided in the head 10 for the mounting of the bracket, which serve to pivotally carry the cylinder in the tub of the washing machine. The holes 17 are of a slightly smaller diameter than the screws or nails which are employed for securing the brackets to the heads, the purpose of which is well known to those skilled in the art. The object of providing these nail holes is to increase the accuracy and quickness with which the brackets may be mounted upon the head. The interior of the cylinders are provided with baffles for increasing the force agitation of the washing fluid and articles being washed. These baffles are carried by the heads 10 and are secured thereto by any suitable means, such as mortise and tenon joints. We have therefore provided means working simultaneously with the boring bits for forming the holes 17 to drill mortise holes 18 on the inner side faces of the heads 10.

Referring now to the detailed construction of the machine, illustrated more clearly in Figures 4 to 8, the supporting structure 20 comprises the two front supporting legs 21—21 and the two rear supporting legs 22—22. The front legs 21—21 are joined together by means of the upper and lower longitudinal timbers 23—23, which are reinforced in the center by the post 24, serving to support cross timbers which carry the counter shafting and other power transmission mechanism for driving the different operating parts of the machine. The two rear legs 22—22 are also joined together by means of the upper and lower longitudinal timers 25—25, which are reinforced in the center in like manner by the posts 26. The front and rear supporting units are joined together at each end by the upper and lower cross timbers 27 and the intermediate supporting timbers 28. Such an arrangement for the supporting timbers and legs form a working surface of open frame construction upon which are supported all of the woodworking elements.

In order to make the machine substantially rigid in structure and prevent displacement of the various supporting members the upper perimeter of the supporting structure is circumscribed by the metallic bands 29 secured in any suitable manner, such as by the screws 29′ or the like. On the interior corners of the frame the cross timber 27 and the legs 21 and 22 are reinforced by means of angle irons 53 which are secured in place by the bolts 54.

The blank 15 is suitably placed in the clamp 30 comprising the two carrying plates 31 and 32, each of which is supported upon separate driving shafts. By referring to Figure 6, it will be seen that the plate 31 consists of an ordinary disc with the inner face finished smoothly, having a hub 33 formed thereon. Thru this hub 33 passes the set screw 34 which is adapted to secure the plate 31 rigidly to the shaft 35. To the plate 31 is secured the feeling cam 36 by means of suitable bolts 37 or the like, the function of which feeling cam will be more fully explained hereinafter.

The shaft 35 is also adapted to carry a gear 38 which gear is suitably driven by the power transmission mechanism. As described, the blank 15 when placed in the clamp 30 is rigidly held therein. In order to provide for such an arrangement the clamping plate 31 has been made longitudinally movable in respect to the co-operating clamping plate 32. While this may be accomplished in any suitable manner, we have shown it accomplished by means of an air chuck 40. The shaft 35 is carried with a rigid sleeve 41 supported in suitable bearings 42 and 43, the bearings 42 being secured upon the cross member 44, while the bearing 43 is secured to the cross timber 27. Lateral displacement outwardly of the rigid sleeve 41 is prevented by the collars 45 which bear on the other side of the bearing 43. On the outer or opposite side of the bearing 43, the operating mechanism of the air chuck 40 is carried. As this air chuck is of common construction and operation, further detailed description is considered as being unnecessary, except, so far as the controlling mechanism is concerned. Motive fluid or compressed air is supplied from any suitable source by way of the pipe line 46, illustrated in Figures 4 and 5. This supply pipe 46 is preferably led to the operator's side of the machine where it connects with an operating valve 47. The operating valve 47 is of ordinary construction and is manually controlled by the control lever 48. This control lever 48 is conveniently located on the operator's side of the machine, so that he may have ready access to it when running the machine. Leading from the valve 47 are the intake and exhaust pipes 49 and 50, respectively, which connect with the air chuck 40 in the usual manner. The outward movement of the shaft 35 by the air chuck 40 is sufficient to permit the clamping plate 31 to be carried far enough from the co-operating plate 32 of the head plate 30 to allow a blank to move freely between them.

As the gear 38, which rotatably drives the head 31, is rigidly mounted upon the shaft 35, movement of the same has to be allowed for without disengaging the driving mechanism. The gear 38 is suitably spaced on the shaft 35 a sufficient distance from the bearing 42 in order that it may not jam against the same during outward movement of the head 31. The gear 51 which is mounted upon the driving shaft 52 serves to drive the gear 38. The gear 38 is in direct alignment with the gear 51 when the clamp 30 is released, that is, when the lever 48 is manipulated to move the clamping plate 31 outwardly. But, when the lever 48 is manipulated to close the head clamp 30 to engage the blank 15, the gear 38 slides inwardly on the gear 51, yet not sufficiently to disengage the same. Hence, there is a constant driving connection between the shaft 35 and the driving shaft 52. The power transmission mechanism of which the driving shaft 52 is a part will be more fully described later on.

The other or opposite clamping plate 32 of the head clamp 30 is rigidly carried by the shaft 55, and may be adjusted thereon by means of the head screw 56'. This adjustment is provided so that, if it is desired to alter or change the thickness of the cylinder head, the head clamp 30 may be readily adjusted to allow for the change. Referring to Figure 14, wherein we have illustrated in side elevation the outer face of the plate 32, a plurality of ribs 56 serve to strengthen the plate 32. An annular ring 57 is provided around the periphery of the plate 32 and is secured thereto in any suitable manner. The ring 57 is provided with a plurality of inwardly extending ears 58 in which are the openings 59. These openings 59 register with openings in the plate 32, and through these the mortise bits are adapted to pass when boring the mortise holes 18 in the head 10. The plate 32 is also provided with openings 60 through which boring bits pass when boring the openings 17 in the head 10. In order to prevent splitting of the holes 17 in the head when the bits pass therethrough, the openings 60 continue on through the plates 31, thereby allowing a clean cut of the openings 17 to be made. As it is not necessary to continue the mortise holes 18 all the way through the head 10, the openings 59 do not extend on through to the plate 31.

A roller support is provided for the plate 32. By referring to Figure 7 wherein this roller support is shown in detail, it will be seen that the center supporting posts 24 and 26 have a portion cut away at the upper end, as indicated at 62. The cross members 63 are ledged in these cutaway portions on the posts 24 and 26, and consequently downward displacement of the cross members 63 due to the forces acting downwardly thereon, is prevented. The rollers 64, 65 and 66 forming the support, are carried in suitable bearings 68 and 69, which are mounted upon the diagonal members 70 and the cross members 63. Preferably two pairs of diagonal members 70 are provided and are spaced a sufficient distance apart to permit the rollers to be suitably disposed, shown in Figures 6 and 7. Each roller is rotatably carried upon separate stub shafts 71, which shafts are carried by the bearings 68 and 69.

Figure 6:
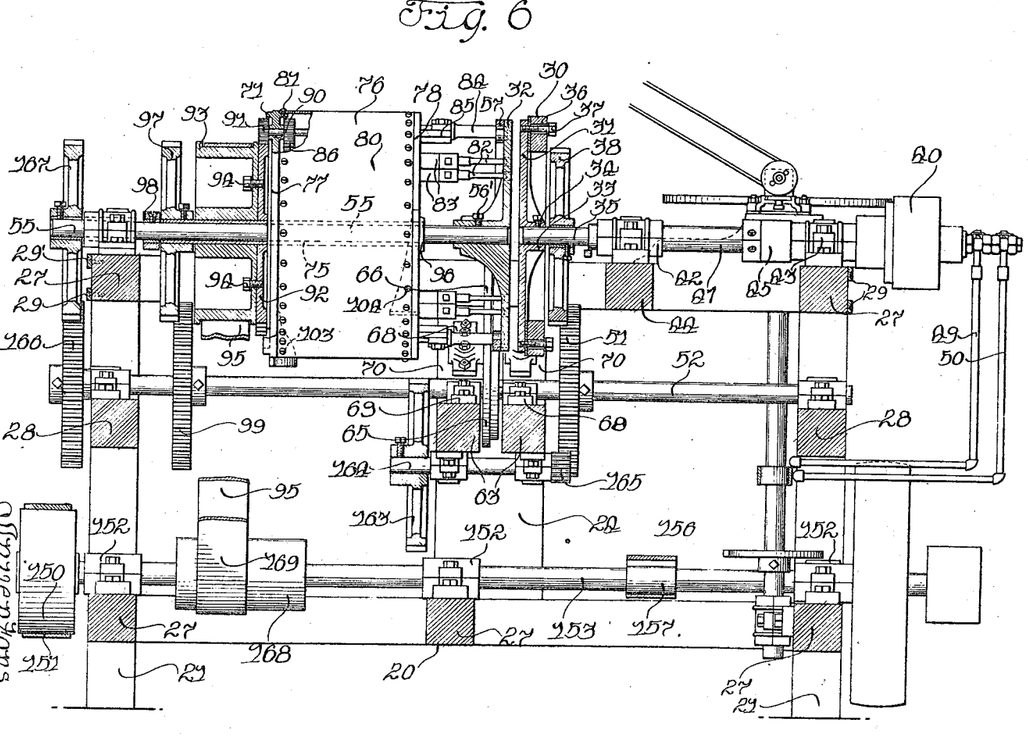
Figure 6 is a vertical section taken transversely to the machine.
Figure 13:
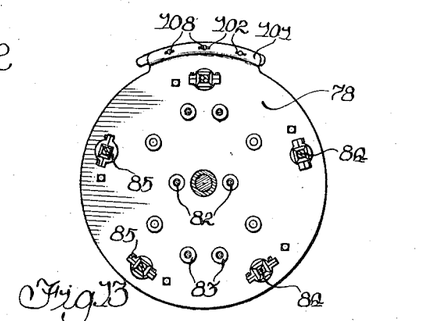
Figure 13 is a detail view of the opposite end of the boring head illustrating the position of the circular boring bits and mortise bits.
Figure 15:
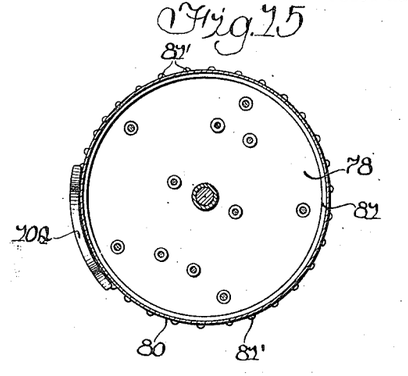
Figure 15 shows in detail the interior side view of one of the head plates of the boring head.
Figure 16:
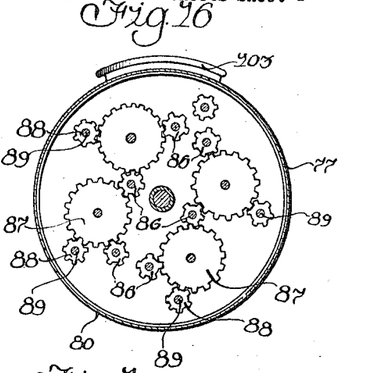
Figure 16 shows in detail the interior side view of the opposite head plate of the boring head illustrating the manner of driving the boring bits and mortise bits.

The head boring mechanism will now be described in detail. The shaft 55, which carries the clamping member 32, has rotatably mounted thereon a sleeve 75, which sleeve is adapted to be driven from the driving shaft 52. The drum 76, carrying the mechanism for boring the mortise and drill holes in the side face of the head 10, comprises two end plates 77 and 78 and the annular housing member 80. The inner faces are so formed that annular flanges 81 are provided, with the outer surface retaining the housing member 80 by means of the screws 81'. Thus access to the interior of the drum 76 may be readily had, should the occasion arise where it is necessary to make adjustment of the boring mechanism. The holes 17 in the head 10 are drilled by the bits 82 carried in the bit stocks 83, and as shown in Figures 6 and 13, the bit stocks are preferably formed integral with the end plates 78. The mortise holes 18 in the head 10 are bored by means of mortise bits 84 carried in the bearing 85. The lower half of the split bearing is formed integral with the end plate 78 while the upper half of the bearing is removable so as to provide for adjustment of the mortise bits 84. As shown in Figure 15, the driving shafts of the drill bits 82 and mortise bit 84 extend through the drum and bear in integral bearings formed on the end plates 78. The shafts, which drive the drill bits 82, have at the opposite ends the pinions 86, which mesh with the intermediate gears 87 carried by the end plate 77. The intermediate gears 87 are driven by pinions 88 carried on the mortise bit shafts 89 which extend through bearings 90 and terminate with the pinions 91, these poinions being driven by a pulley gear 92 rotatably mounted on the sleeve 75.

A pulley 93, also rotatably mounted upon the sleeve 75, is secured to the gear 92 by means of bolts 94, or the like, and is driven by the belt 95 driving from the main power shaft. The inner end of the sleeve 75 passes centrally through the plates 77 and 78 of the drum 76 and preferably terminates in the integral bearing 96 on the outside face of the plate 78. The other or opposite end of the sleeve 75 terminates at the free side of the pulley 93 rigidly carrying the gear 97 thereon. The collar 98 serves to hold the sleeve 75, drum 76, and pulley 93 in position on the shaft 55. It has been found in the art that it is necessary that drilling bits approach the blank upon which the operation is being performed at a comparatively slow rate of speed, which prevents splitting of the wood, and undue strain and overheating of the bits. Means have therefore been provided so that the drum slowly advances toward the head clamp 30 in which the blank is drilled, while at the same time, the drum rotates approximately once around during the performance of one boring operation. This is accomplished by means of the gear reduction, to be hereinafter explained, and the gear 99 on the driving shaft 52 meshing with the gear 97. As explained in the case of the gears 38 and 51, the gears 97 and 99, have sliding engagement, as well as meshing engagement, so as to compensate for the movement of the drum 76 which rotates.

Each side plate of the drum 76 is provided with integral extensions 100 and 101 which have therein the bolt openings 102 through which the bolts 108 pass. The bolts 108 tap into cam plates 103 and 104 shown in dotted lines in Figure 6. Directly behind the drum 76 and located on the cross timber 25 of the supporting frame, a roller supporting plate 105 is carried. This plate 105 is bolted upon the frame, so that, when the drum 76 is initially rotated in the direction of the arrow shown in Figure 5, the cam 103 engages the roller 106 and advances the head 76 towards the clamp 30, and in turn, the boring operation is performed. The cam 103 is so shaped that its dwell is gradual, thereby advancing the head 76 gradually. As soon as the cam 103 is at the end of engagement with the roller 106, the cam 104 begins to ride the roller 107 and the drum moves back into normal position. The dwell of the cam 104 is much quicker, as it is essential to move this drum back as quick as possible, in order to facilitate quick removal of the head 15 after this operation has been performed.

Figure 5:
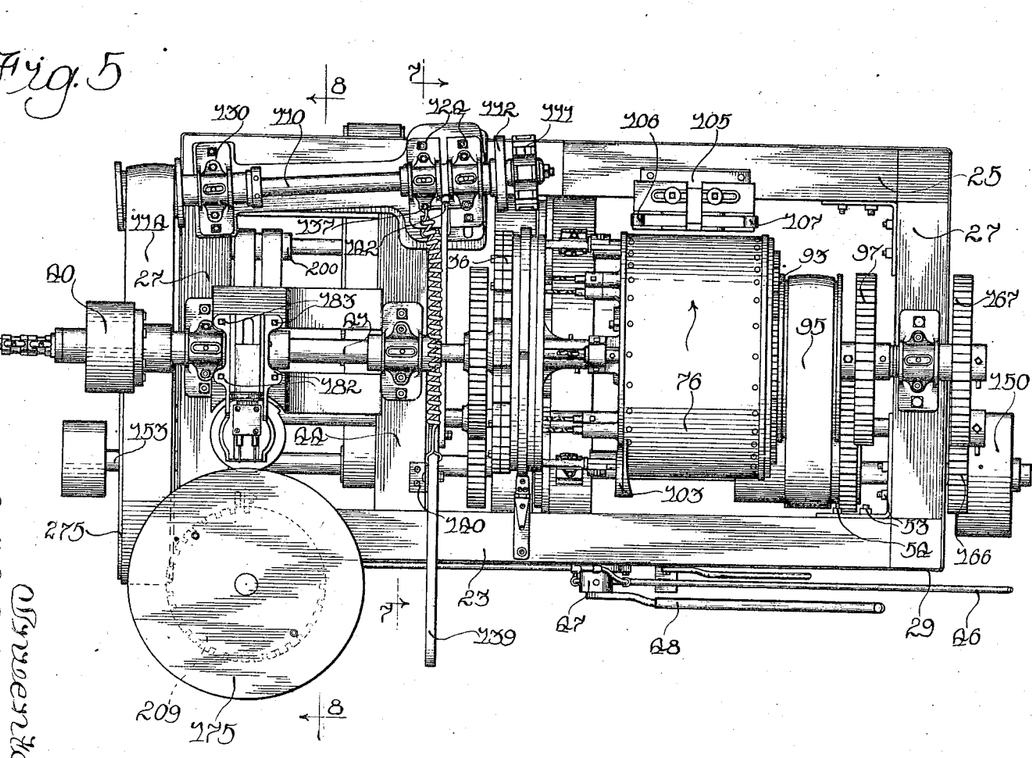
Figure 5 is a top plan view of the same.
Figure 17:
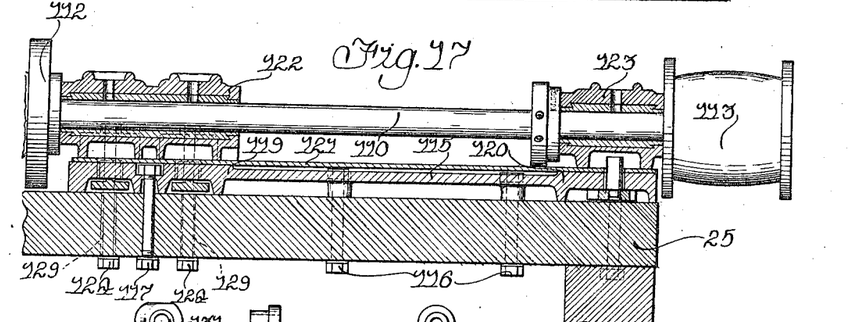
Figure 17 is a vertical section taken transversely through the cutter mechanism.
Figures 18, 19:
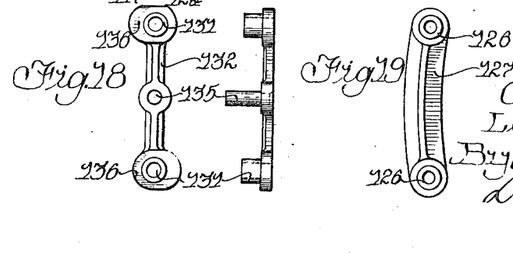
Figure 18 is a detail, side and front, elevational view of a connecting strap employed on the cutter mechanism.
Figure 19 is a detail elevational view of a similar connecting strap employed in the same mechanism.

The cutter mechanism, which shapes the perimeter of the blank 15 into the finished form of 30 faces, viz, polygonal, is mounted upon the supporting frame, preferably on the cross timber 25. Referring to Figures 5 and 17 wherein a detailed view is shown, the shaft 110 carries the cutter knife 111 and feeling roller 112. The cutter knife 111 is of well known construction and need not be explained, except that it is located directly in alignment with the blank 15 when mounted in the head clamp 30. Directly adjacent the cutter knife on the shaft 110 the feeling roller 112 is disposed, so that, when the cutter knife 111 is facing the perimeter of the blank 15, the feeling roller rides the feeling cam 36.

The shaft 110 being on a sliding bearing, the feeling roller 112 controls the engagement of the cutter knife 111 in accordance with the contour of the feeling cam 36. As before mentioned, this feeling cam is suitably bolted to one of the clamping brackets of the head clamp 30. It is therefore obvious and apparent, that the shape of the product produced by our machine may be of any configuration, as the shape of the feeling cam might be varied according to the need, and hence, obtain heads of various shapes. At the outer end of the shaft 110 the pulley 113 is mounted and preferably driven by the power shaft by means of the belt 114, or any other suitable driving connection. It is a well known fact to those skilled in the art, that the greater the velocity of a cutter shaft, the smoother the cut of the knife. Hence we contemplate driving the cutter shaft 111 at a comparatively high velocity by driving directly from the power shaft and by employing a large driving pulley 275.

Figure 8:
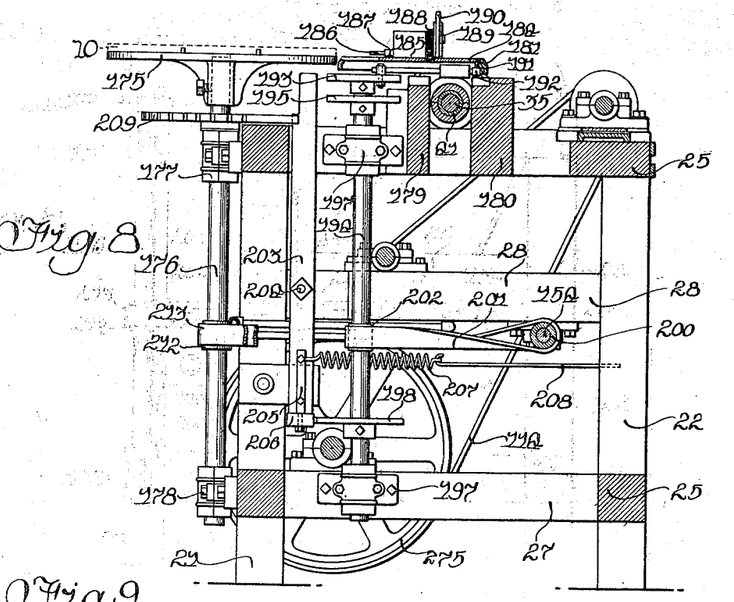
Figure 8 is a vertical sectional view taken on line 8—8 of Figure 5; illustrating the mechanism for boring the peripheral openings in the head.
Figure 20:
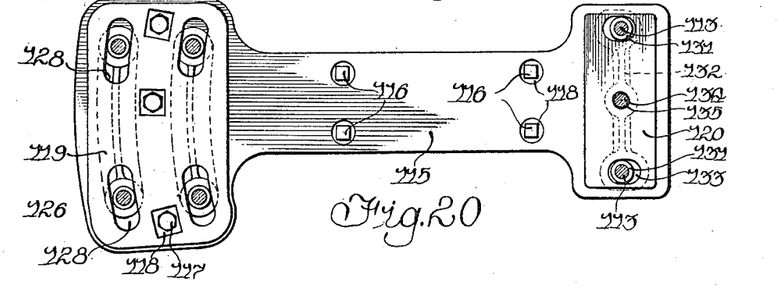
Figure 20 is a plan view of the rigid bearing plate for carrying the cutter shaft.
Figure 21:
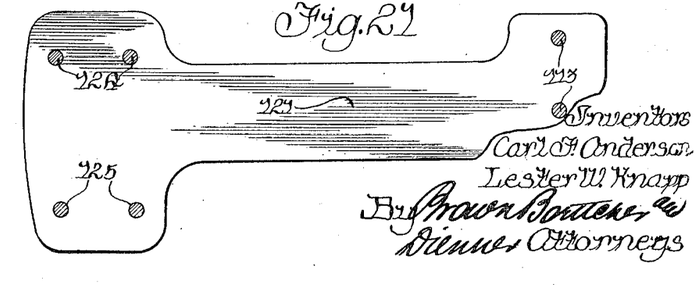
Figure 21 is a similar view showing the sliding bearing plate for carrying the cutter shaft.

As illustrated in Figure 8, the upper longitudinal timber 25 of the supporting unit comprising the uprights 22 is cut away on the upper surface and increased in width so as to give a large bearing area for the sliding bearing members of the cutter mechanism. This cut away portion permits the stationary plate member 115 to be recessed in the timber 25. The plate 115 is preferably secured rigidly to the frame work by means of the central bolts 116 and bolts 117 which are countersunk in the pockets 118—Fig. 20. The top surface of the plate 115 is provided substantially at each end with engaging portions 119 and 120 having a smooth planar surface, upon which the sliding plate 121 is adapted to be carried. The cutter shaft 110 is carried by two bearings 122 and 123 which are of the well known construction, the bearing 122 having a greater bearing area, as the front end of the shaft sustains a greater working strain. The bolts 124 securing the bearing 122 to the plate 121 pass through holes 125 therein, studs 126 of the guiding strap 127 riding in guiding slots 128, and slots 129 in the timber 25.

The bearing 123 at the opposite or other end of the shaft 110 is secured to the plate 115 in a similar manner, that is, the bolts 113 of the bearing 123 pass through studs 131 of the guiding strap 132 and into the timber 25. The studs 131 of the guiding strap 132 ride in the slots 133, which are oblong in configuration, thereby allowing the studs 131 lengthwise play. The strap 132 is also provided with a centrally projecting stud 135 which is adapted to pass through an aperture 134 centrally located in bearing portion 120. As the cutter knife 111 is moved toward and away from the head clamp 30, the shaft pivotally swings about the stud 135 serving as its pivot, the movement being such that a driving relation between the power shaft and pulley 113 is constantly maintained. Thus a sidewise movement of the plate 121 takes place which is compensated for by the slots 133. The strap 132 is provided with an enlarged base portion 136 at the foot of the stud 131, thereby allowing an abutment for the strap to properly guide the studs in the slots 133.

As the stud 135 serves as the pivot for the cutting knife, the slots 128 are arcuated in formation with the stud 135 as the center described by the arc. The strap 127 with its studs 126 move in the slots 128 with the cutter in its movement. The plate 121 also moves, it bearing upon the planar surfaces 119 and 120, thereby providing a novel sliding engagement between the plates 115 and 121.

Figure 7:
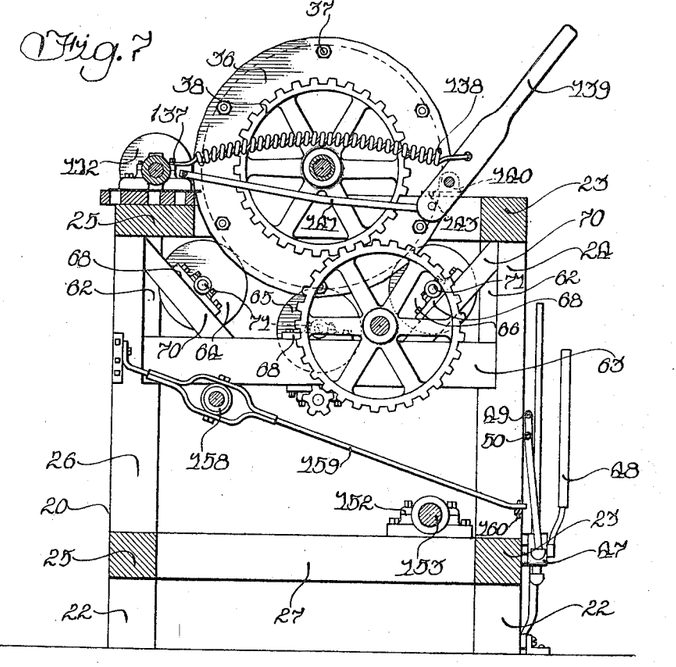
Figure 7 is a vertical sectional view taken approximately on line 7—7 of Figure 5 and looking in the direction of the arrows.

The bolts 137 of the bearing 122 secure one end of the spring 138, which tends to engage the knife 111 with the blank 15. Referring to Figure 7, the other end of the spring 138 is secured to the lever 139, this lever 139 operating the cutter mechanism and controlled manually by the operator. The lever 139 is pivotally carried by the lug 140, which is secured to the cross member 44, as by bolting or the like. The spring 138 normally retains the cutting knife 111 into cutting engagement with the lever in upward position. Having the spring 138 hold the knife 111 in cutting engagement is especially efficacious, in the present instance, for the reason that the feeling roller 112 is permitted to ride more freely about the shaping cam 36 and thereby control the movement of the knife over the edge of the head clamp. This will become especially apparent when it must be considered that the roller 112 in riding over the edge of shaping cam 36, must firmly bear thereagainst at all points therealong, but resiliently to permit a rise and fall thereon in traveling over the high spots (where adjoining faces meet), and over the low spots—at the center of each face 11. After the cutting operation is performed the cutting knife 111 is moved out of cutting engagement by means of a lever 141 which is pivoted at one end to the bearing 122 indicated at 142, and at the other end to the lower end of the lever 139. Thus it will be seen that the lever 141 tends to operate against the tensile tension of the spring 138 when the control lever 139 is moved down after the boring and cutting operation of the machine to move the knife 111 and feeling roller 112 out of operating engagement. Provided on the machine, so that the lever 139 may be held in downward position without attention of the operator, is the stop latch 143 which is free to swing under and away from the lower end of the lever 139, thereby enabling the spring 138 to be retained in actuated position.

It is well known in the practice that in order to acquire the most efficient performance of the various wood working operations, it is essential that the mechanism for each operation be driven at the required velocity. Generally the boring operation is performed at a velocity much higher than that of the cutting or shaping operation. Hence we have provided a power transmission mechanism which is adapted to drive the various parts of our machine at speeds which vary to each other, several of the drives working in conjunction, so that during substantially one movement of the machine several wood working operations are performed upon the blank in the head clamp 30.

Power is provided from any suitable source and drives the main power pulley 150 by means of the belt 151. The main power shaft 153 carrying the pulley 150 extends the length of the machine and is secured to the cross members 27 of the frame by means of the bearings 152. As shown in Figure 4, the counter shaft 154 is geared down through the large driven pulley 155, belt 156 and driving pulley 157 on the power shaft 153. The driving shaft 52 is geared down through a double reduction gearing from the counter shaft 154 and also through the intervention of a clutch 158. The operation of throwing this clutch in and out is effected by a long operating lever 159 which extends and slants downwardly to the front of the machine and then to a convenient position for operation at the front of the machine, as illustrated in Figures 4 and 7. The front end of the lever 159 pivotally connects with a sliding lever 160. The lever 160 reciprocates in a slot provided in the post 24 and pivotally connects with the operating lever 161. The lever 161 is located in front of the machine adjacent the air chuck lever 48, so that each may be conveniently operated by a single attendant.

The double reduction gearing comprises the pinion 162 carried by the countershaft 154, the large gear 163 on the subshaft 164, and the intermediate double gearing, consisting of the pinion 165 on the shaft 164 and the large driving gear 51 on the driving shaft 52. As before mentioned, the gear 51 drives the gear 38, thereby driving the shaft 35 which in turn rotates the plate 31 of the head clamp 30. The other plate 32 of the head clamp is driven by the gear 166 on the shaft 52 and the gear 167 on the shaft 55. It is apparent that the shaft 35 is rotated in unison with the shaft 55 as the gear reduction driving each from the driving shaft 52 is substantially of the same size. The gear 97 driving the drum 76 and meshing with the gear 99 on the driving shaft 52 is driven at the same speed as the shaft 55 but is independent thereof, though mounted thereon. The sleeve 75 carrying the gear 97 and drum 76 has loose engagement with the shaft 55, and hence the driving of one does not affect the driving of the other. As before mentioned, the drum is adapted to advance independently toward and away from the head clamp 30 for the purpose of performing the boring operation. The bits 82 and 84 for boring the nail holes 17 and mortise holes 18 are driven at a velocity much greater than the drum 76 and head clamp 30. The pulley gear 92 driven by the pulley 93 is driven directly from the power shaft 153 through the pulley 168 and belt 95. Thus the double gear reduction is not employed in the driving connection of the boring mechanism.

By referring to Figure 2, it will be seen that the perimeter of the head 10 is provided with the openings 14 for the reception of the screws or nails securing the slats 12 to the head. The boring mechanism for performing this operation will now be described. After shaping the perimeter of the head 10 polygonal and boring the nail holes 17 and mortise holes 18 while in the head clamp 30, the air chuck control lever 48 is manipulated to open the clamp 30. The head 10 is then removed and placed upon the plate 175, which is carried by the vertically extending shaft 176, the shaft 176 being carried by the frame in the bearings 177 and 178. The cross timbers 44 and 27 of the frame support two laterally extending cross timbers 179 and 180 which carry the bed member 181 having lateral projecting lugs 182 through which bolts 183 pass into the members 179 and 180. Reciprocating in this bed member 181 is the plate 184 on which is rigidly secured the boring box 185. This boring box 185 comprises the two projecting bits 186 retained by the bit stocks 187 having suitable bearings in the box 185, the box 185 carrying the gears 188 and the pulley 189. The pulley 189 is driven from any suitable source of power through the belt 190.

The rear end of the reciprocating plate 184 has the pin 191 secured therein which is connected with the connecting rod 192. The other end of the connecting rod is eccentrically secured to the disc 193 mounted upon the upper end of the shaft 194. A similar disk 195 is also carried on the shaft 194 directly below the disk 193, and upon each of these disks are formed the cams 196. The shaft 194 is supported upon the cross timbers by means of the bearings 197. At the lower end of this shaft a third disc or plate 198 is carried which also has a cam or projection 199 thereon. The countershaft 154 is adapted to drive the shaft 194 through the pulley 200 and belt 201, having a slip drive with the pulley 202.

The cams 196 are adapted to be periodically engaged by a lever 203 fulcrumed to the member 28 at 204. The lower end of the lever 203 carries a bar 205 bolted thereto which has secured at the free end thereof the roller 206 engaged by the cam 199 also periodically. The bar 205 retains one end of the spring 207 while the other end is held by a rod 208 rigidly secured in the supporting leg 22. Directly above the bearing 177 a plate 209, having a plurality of peripheral slots 210 therein, is carried on the shaft 176. It is apparent that there is a slot for each face of the polygonal head 10, except that portion of the plate 209 designated 211. This portion 211 is equivalent to the space occupied on the cylinder head by the cover of the washing machine cylinder. While it is necessary to form the faces 11 on this portion of the head, it is not necessary to drill the nail holes 14, as the cover of the cylinder is removable and hence the cover slats are not secured to the head. Each slat 110 is adapted to be engaged periodically by the lever 203, so that the reciprocating plate 184 may be allowed to advance toward the head on the plate 175 and permit the bits 186 to bore the holes 14 in the faces 11.

Figure 9:
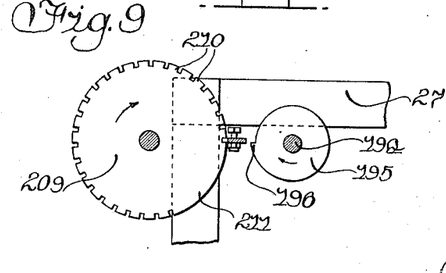
Figure 9 is a detail fragmentary sectional view illustrating the mechanism for controlling the positions of the head during the boring of the peripheral holes.
Figure 10:
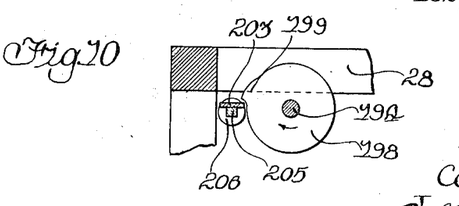
Figure 10 is a detail fragmentary view of the same mechanism on a different plane; illustrating the releasing device employed.
Figure 11:
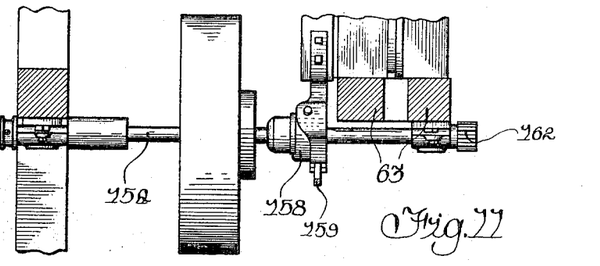
Figure 11 is a detail fragmentary view showing the clutch mechanism.
Figure 12:
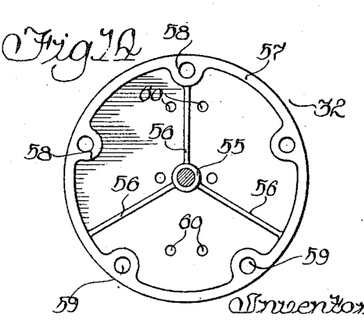
Figure 12 is a detail end view of the boring head illustrating the manner of driving the boring bits independent of the rotation of the boring head.

The shaft 176 carrying the plate 175 has a similar driving connection as the shaft 194, that is, a belt 212 is entrained over the pulley 200 and has a slip connection with the pulley 213. The spring 207 constantly tends to keep the lever 203 into engagement with the slots 210. As the shaft 194 is rotated in the direction of the arrows as shown in Figures 9 and 10, the cam 199 engages the roller 206 and consequently cams the lower end of the lever 204 outwardly under the tension of the spring 207. The lever 203 is then thrown out of engagement with the slot 210 and into engagement with the projections 196 on the plates 193 and 195, and thus further rotation of the shaft 194 is prevented. The slip drive between the belt 212 and pulley 213 then picks up and the shaft 176 rotates, in the direction of the arrow shown in Figure 9, to the next slot. At this period the cam 199 has rolled out of engagement with the roller 206 and the lever 203 returns to normal position, that is of engaging the next slot 210, by means of the spring 207. Then the shaft 194 again rotates until the cam 199 engages the roller 206 on its next revolution. During this period of the rotation, the eccentric action of the connecting rod 192 and disc 193 brings the boring bits 186 into boring operation with the adjacent face 11.

Figure 22:
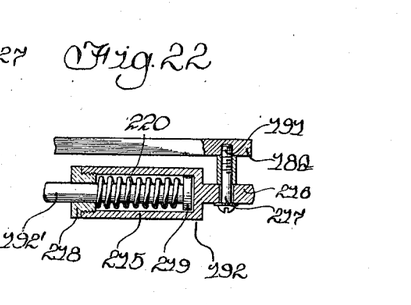
Figure 22 is a detail fragmentary section of the spring connection of the connecting rod of the reciprocating plate.

This operation is continually repeated until the portion 211 of the perimeter of the plate 175 advances into engagement with the lever 203, whence the shaft 194 is held against rotation for a greater period of time. As the boring box 185 approaches the head 10 on the plate 175 its movement is uniform until the bits 186 engage the face 11, when the movement is retarded slightly due to the resistance the bits 186 offer at the initial engagement. The shaft 194 continues to rotate, which consequently carries the connecting rod 192 around in its path of movement. In order to allow for the sudden momentary stop in movement of the boring bits 186, a resilient connection is interposed in the connecting rod, the details of which connection are illustrated in Figure 22. A sleeve like spring housing 215 is interposed in the connecting rod 192, this housing having a reduced stud 216 connected to the reciprocating plate 184 by means of the bolt 191 threading into the plate. The other portion of the connecting rod is guided for motion in the spring housing 215 by the guide nut 218 which runs into and closes off the outer end of the housing 215. The end of the connecting rod section 192' is provided with the collar 219, and confined between this collar and guide nut 218 is a compression spring 220.

The operation of the cutter mechanism and boring mechanism is as follows:

A blank 15 is placed in the head clamp 30 by the attendant of the machine by gripping the projection 16 and holding the same in the clamp until the lever 48 is manipulated to operate the air chuck 40, and thereby cause the clamp to rigidly hold the same. The clutch lever 161 is then manipulated to throw the clutch 158 into engagement, causing the power shaft to drive the driving shaft which, in turn, drives the head clamp and drum 76. The drilling bits 82 and mortise bits 84 are constantly being driven direct from the power shaft 153 through a reduced gearing comprising the pulley 168, belt 95 and pulley 93 carrying the gear 92, and hence, the drive of these bits is independent of the drive of the drum 76 and clamp 30 and is at a comparatively higher velocity. With the drum 76 revolving in unison with the head clamp 30 and blank 15 and the drilling and mortise bits driving independently, the cam 103 approaches the roller 106. The dwell of the cam 103 is gradual and hence the advancing movement of the drum toward the head clamp is gradual. By the time the roller 106 has ridden the cam 103 and thereby advanced the drum 76 sufficiently forward to perform the face boring operation, the forward edge of the cam 104 approaches into a riding engagement with the roller 107. The dwell of this cam is relatively different from that of the cam 103, the greatest rise of dwell being substantially centrally disposed on the cam, so that, the drum 76 may be rapidly withdrawn from advanced position so as to remove the bits from the blank 15 as soon as possible.

Working simultaneously with this face boring operation of the blank 15, is the shaping or cutting operation of the perimeter of the blank. As soon as the clutch 158 is thrown into driving engagement with the face boring mechanism, it works automatically, that is, further attention of the attendant is unnecessary. The attendant or operator then manipulates the lever 139, releasing the latch or stop 143 from under the lower end of the lever 139 and allowing the lever to slowly rise with the tension of the spring 138. The cutter knife 111 is then pivotally moved inwardly with the feeling roller 112. The knife 111 cuts into the wood until the feeling roller 112 engages and rides the feeling cam 36 mounted on the clamp 30 adjacent to blank 15. Hence, it will be apparent that the contour of the head 10 will be dependent upon the contour or shape of the feeling cam 36. The head 10 is then removed from the head clamp 30 by manipulation of the air chuck lever 48 by the attendant from where it is placed upon the retaining plate 175 and the perimetral nail holes 14 are bored therein. The plate 175, as before explained, is driven by the belt 212 from the countershaft 154 and is held from complete rotation by means of the notched timing plate 209 engaged by the detent lever 203. The action of the detent lever 203 is controlled by means of cams 196 and 199 carried on plates 193, 195 and 198 respectively on the shaft 194. This shaft is driven also from the countershaft 154. Concentrically connected to the plate 193 is the reciprocating plate 184 carrying the boring box 185 in which the bits 136 are disposed. As the plate 184 reciprocates back and forth, the bits 186 engage the adjacent peripheral face of the head cam and performs the boring of the nail holes 14. As explained before, after the holes 14 are bored in the face 11 facing the bits 186, the detent lever 203 is swung out from engagement with the latch plate 209 to allow the shaft 186 to revolve the head 10, so that the succeeding face 11 is in position for the next boring operation. This movement continues until the detent lever 203 engages the peripheral portion 211 of the plate 209, whereupon the shaft 176 is allowed to revolve to the next notch, in order to prevent this boring operation from being performed upon the faces 11, represented by the portion 211.

It is to be understood that we do not intend to be limited to the contour of the head produced by the machine embodying our invention, as it is apparent that the configuration of the feeling cam 36 may be modified, as this would merely mean changing the shape of the washing machine cylinders, which is considered to be not of the essence of this invention, that the cylinder head may or may not be polygonal; that a different arrangement or purpose of the holes 17 may be had; and that various other arrangements and constructions which would produce the different features of our invention may be had; and we do not, therefore, intend to limit ourselves to the particular constructions and arrangements shown.

We claim:

1. In a machine of the class described, the combination of a rotary cutter knife for performing a cutting operation on a head blank, a head clamp adapted to retain said head blank during the cutting operation and to present by relative movement the entire periphery of said head blank to the knife, and boring mechanism associated in timed relation with said head clamp for boring a plurality of holes about the face of said head blank during the cutting operation.

2. In a machine of the class described, the combination with a rotary cutter knife for performing a cutting operation on a head blank, a head clamp for said head blank, means for bringing said cutter knife into cutting position with said head clamp, means for causing said head clamp to present in a continuous line the periphery of the head blank to said rotary cutter knife, and boring mechanism for boring holes in the head portion of the blank while said head clamp is presenting the periphery of the blank to said cutter.

3. In a machine of the class described, the combination of a rotary cutter knife, clamping members for carrying a head blank, means for rotating said clamping members, means for swinging said cutter knife into engagement with the periphery of said head blank as said clamping means are rotated, boring mechanism, and means for advancing said boring mechanism toward said clamping members in timed relation so that the boring operation takes place as the clamping members are rotated.

4. In a machine of the class described, the combination of rotary cutter mechanism and retaining plate members for carrying a blank, boring mechanism operating simultaneously with said cutter mechanism for boring a plurality of holes in the blank, a drive for said rotary cutter mechanism, means for permitting said rotary cutter to travel the perimeter of said blank to perform a cutting operation on the same thereby conforming it to any predetermined configuration, said boring mechanism driven in timed relation to the traveling of said cutter knife about the periphery of the blank.

5. In a machine of the class described, wherein a blank member is adapted to have performed thereon a series of operations, a rotatable head clamp for rigidly holding the blank member, a rotary cutter mechanism adapted to advance toward the head clamp to perform a cutting operation on periphery of the blank, as the head clamp is rotated, a multiple drill head adapted to advance toward the head clamp during its rotation to perform a drilling operation on the blank, said head clamp being stationary relative to the movement of said cutter mechanism and said drill head.

6. In a machine of the class described wherein a blank member is adapted to have performed thereon a series of operations, the combination of a head clamp for rigidly retaining a blank member during the operations, a rotary cutter knife adapted to advance toward the head clamp to perform a cutting operation on the blank to shape the same into a predetermined configuration, a movable drill head adapted to advance sidewise toward the clamp to perform a boring operation during the performance of the cutting operation, said cutting operation and boring operation being performed substantially during one revolution of the head clamp.

7. In a machine of the class described wherein a head blank is adapted to have performed thereon a plurality of operations simultaneously, the combination of the rotary cutter mechanism, means for driving said cutter mechanism, a series of drills, means independent of said cutter driving means for operating said drills for drilling a plurality of holes in and through said head blank, and means for retaining said head blank and presenting the periphery thereof to said cutter mechanism, said retaining means and said cutter mechanism cooperating to remove a plurality of successive sectors from the head blank.

8. In a machine of the class described wherein a head blank is adapted to have performed thereon a series of operations, the combination of the rotary cutter mechanism, means for driving said cutter mechanism, a series of drills, means independent of said cutter driving means for operating said drills for drilling holes in and through said head blank, a head clamp for rigidly retaining the head blank during said operation, and means for rotating said head clamp so as to present the perimeter of the same to the rotary cutter, said rotary cutter removing a plurality of sectors from the head blank.

9. In combination, a head blank adapted to have performed thereon a series of operations, carrying means for retaining said blank during the operations, a rotary cutter knife for performing a cutting operation, means for providing operative movement relative to said cutter knife and carrying means, boring mechanism for boring a plurality of holes simultaneously with said cutting operation, and means on said rotary cutter mechanism and said carrying means serving to guide the cutter knife in a set path around the head blank.

10. In combination, a head blank adapted to have performed thereon a series of operations, retaining plate members for carrying said blank so that a portion thereof is presented to the different operating mechanisms comprising, rotary cutter mechanism for performing a cutting operation, boring mechanism for boring a plurality of holes simultaneously with said cutting operation, means for providing relative movement to said retaining plate member and rotary cutter mechanism, and means for guiding the engagement of the rotary cutter mechanism and head blank comprising, a feeling roller on said cutter mechanism and a feeling cam on said retaining plate member.

11. In combination with retaining plate members comprising a head clamp for carrying a head blank member and rotary cutter mechanism, boring mechanism for operating simultaneously with said cutter mechanism for boring a plurality of holes in said blank at substantially right angle to the cutting operation, driving means for said rotary cutter mechanism, driving means for said boring mechanism independent of said cutter driving means, a feeling roller on said cutter mechanism, a feeling cam carried by said head clamp, said feeling roller traveling said feeling cam to guide the cutter mechanism in a path conforming to the configuration of the feeling cam.

12. In combination with clamping plate members comprising a head clamp for carrying a head blank, of manually controlled means for opening and closing said clamping plates to rigidly retain the blank during a series of operations, rotary cutter mechanism adapted to advance toward the blank to perform a cutting operation while the periphery of the same is presented thereto, lever mechanism for controlling the engagement of the rotary cutter mechanism and blank comprising, a spring for normally holding said rotary cutter mechanism against the blank during the cutting operation, a manually controlled lever and an intermediate link connecting said rotary cutter and said lever for moving said cutter out of engagement, means guiding the movement of said rotary cutter while in engagement with the blank comprising a feeling roller engaging a feeling cam, and a multiple drill head having automatic advancing movement to perform a boring operation in the head blank while the periphery thereof is being trimmed.

13. In a machine of the class described wherein a head blank member is adapted to have performed thereon a series of operations, a head clamp for rigidly holding the blank member, a rotary cutter mechanism adapted to advance toward the head clamp to perform a cutting operation on the blank, means for guiding and determining the path of engagement of the head blank and rotary cutter, said means comprising a member having a configuration of a finished head member adapted to be traveled by a guiding roller, a series of drills adapted to automatically advance toward the head clamp to perform a drilling operation on the blank, while the cutter mechanism is being guided in its cutting operation on the blank.

14. In a machine of the class described wherein a head blank member is adapted to have performed thereon a series of operations, the combination of a head clamp for rigidly retaining said blank member during the operations, a rotary cutter knife adapted to advance toward the head clamp to perform a cutting operation on the blank, a guiding roller adapted to ride a feeling cam serving to guide the rotary cutter knife after said advancement, a multiple drill head independent of the cutter mechanism adapted to advance sidewise toward the clamp to perform simultaneously a boring operation at right angles to the cutting operation, said cutting operation and boring operation being performed substantially during one revolution of the head clamp.

15. In a machine of the class described wherein a head blank member is adapted to have performed therein a series of operations, the combination of a rotary cutter mechanism having a free pivotal movement, means for driving said cutter mechanism, a series of drills, means independent of said cutter driving means for operating said drills for drilling holes in and through said head blank, a head clamp for rigidly retaining said blank during said operation, driving means for rotating said head clamp, means for bringing the rotary cutter into engagement with said head blank, and shaping means for presenting successive portions of the perimeter of the head blank to the rotary cutter comprising a feeling roller guiding the free movement of the rotary cutter during operation and adapted to track a feeling cam adjacent said head blank.

16. In combination, a rotatable clamp for holding a blank during a boring operation, means for performing a shaping operation on said blank while in rotation, a multiple drill head for periodically advancing toward said clamp, means for driving said drills in said head, and means for rotating said drill head at a different speed to that of said drills.

17. In a multiple drill head containing a series of drills, the combination of end head members having bearings thereon, shafts passing in and through said bearings, pinions on said shafts, intermediate gears carried by one of said head members for meshing with said pinions, a plurality of drills carried at one end of the head having gears meshing with said intermediate gears, a second set of pinions on said shafts, a means driving said second set of pinions whereby said drills are driven.

18. In combination, a multiple drill head adapted to perform a series of drilling operations on a stationary blank member adapted to rotate comprising, end head members having bearings thereon, shafts passing through and carried by said bearings, drills for drilling holes in a blank member, means for driving said shafts, said shafts driving said drills, means cooperating automatically upon rotation of the drill head for advancing the same to the blank member rotating in unison therewith.

19. In combination, a multiple drill head adapted to perform a series of drilling operations on a blank member carried by a stationary head clamp comprising, end head members having bearings thereon, shafts passing through and carried by said bearings, drills for drilling holes in said blank members, means for driving said shafts, said shafts driving said drills, and camming means for automatically advancing and returning said drills upon rotation of said drill head to perform a drilling operation on said blank member.

20. In combination, a supporting frame adapted to rotatably carry a multiple drill head comprising, end head members, drills carried by said head members, means driving said drills, and means on said head members and supporting frame adapted to automatically cooperate to advance said drill head upon rotation.

21. In combination, a supporting frame adapted to rotatably carry a multiple drill head comprising, a series of drills for drilling holes in a blank member, means for driving said drills, cam members on said drill head, cooperating rollers on said frame, and means for rotating said drill head whereby the same is advanced to perform a drilling operation.

22. In combination, a supporting frame adapted to rotatably carry a multiple drill head and means for retaining a blank member, a series of drills carried by the head, driving means for said drills, cam members on said drill head, co-operating rollers on said frame, and means independent of first said driving means for rotating the head whereby said cams engage said rollers to advance said drill to perform a drilling operation on said blank.

23. In combination, a supporting frame, a multiple drill head mounted on said frame having a series of drills, a rotating head carrying member adapted to retain a blank member, camming means on said drill head, cooperating rollers on said frame, means for rotating said drill head in unison with said head carrying member, independent driving means for said drills, said camming means and cooperating rollers engaging upon rotation of the drill head to advance the drill to perform a drilling operation on said blank whereupon said drills are returned to normal position.

24. In combination, a supporting frame, a multiple drill head mounted on said frame having a series of drills, a head carrying member adapted to retain a blank member and be in the path of operation of the drill head, a rotary cutter mechanism, means driving said drills, means driving said drill head and said carrying member in unison with each other, and means driving said rotary cutter independent but during the operation of said drill head, head carrying member or drills whereby the cutter cooperates in performing its operation.

25. In combination, a supporting frame, a multiple drill head mounted on said frame having a series of drills, a head carrying member adapted to retain a blank and be in the path of operation of said drill head, a rotary cutter mechanism for performing a cutting operation on said blank, means driving in unison said drill head and head carrying member, means driving said drills at a relatively high velocity to the movement of said drill head and head carrying member, independent means for driving said rotary cutter mechanism, and means upon rotation of said drill head for advancing the same toward said head carrying member to permit said drills to perform a drilling operation on said blank while the cutter mechanism operates to shape said blank.

26. In combination, a supporting frame, a head clamp on said frame comprising two head plates, a stationary shaft rigidly carrying one of said plates, a movable shaft rigidly carrying the other said plate, a sleeve carried by said frame permitting said movable shaft to slide therein, pneumatically controlled means for causing said sliding movement, a multiple drill head concentrically carried by said stationary shaft and having sliding movement thereon, a series of drills on said drill head, and means for advancing said drill head toward said head clamp to permit the drills to pass through openings in the adjacent head plate to permit a drilling operation on a head blank.

27. In combination, a supporting frame, a head clamp on said frame comprising plate carrying members, shafts in axial alignment for carrying said plate members, one of said shafts having translational movement in respect to the other, the other said shaft adapted to concentrically carry a plate member, a multiple drill head rigidly mounted on a sleeve and having a plurality of drills, means for advancing said drill head toward said head clamp, and driving means operating said drills for drilling holes into and through a blank member carried by said head clamp.

28. In combination, a supporting frame, a head clamp on said frame comprising plate carrying members, shafts in axial alignment for carrying said plate members, one of said shafts having translating movement in respect to the other, the other said shaft adapted to concentrically carry a sleeve member, means for rotating said shafts in unison so as to rotate said head clamp and thereby present the periphery of the blank to a cutter, a multiple drill head rigidly mounted on said sleeve and having a plurality of drills, means for rotating said drill head independently of the shaft carrying said sleeve, means driving said drills independently of said drill head, and camming means for advancing said drill head toward said head clamp.

In witness whereof we hereunto subscribe our names this 17th day of June, 1920.

CARL F. ANDERSON.
LESTER W. KNAPP.

Certificate of Correction.

It is hereby certified that Letters Patent No. 1,459,965, granted June 26, 1923, upon the application of Carl F. Anderson, of Brookfield, and Lester W. Knapp, of Berwyn, Illinois, for an improvement in "Woodworking Machines," were erroneously issued to "Conlon Electric Washer Company, of Cicero, Illinois, a Corporation of New York," whereas said Letters Patent should have been issued to *Conlon Corporation, of Cicero, Illinois, a Corporation of Illinois*, said corporation being assignee, *by mesne assignments*, of the entire interest in said invention, as shown by the records of assignments in this office; page 3, line 110, for the word "with" read *within;* and that the said Letters Patent should be read with these corrections therein that the same may conform to the record of the case in the Patent Office.

This Certificate supersedes Certificate of Correction issued August 14, 1923.

Signed and sealed this 16th day of October, A. D., 1923.

[SEAL.]

WM. A. KINNAN,
*Acting Commissioner of Patents.*